(12) United States Patent
Cha et al.

(10) Patent No.: US 7,837,885 B2
(45) Date of Patent: Nov. 23, 2010

(54) AIR BEARING DESIGN WITH A FLATTER PITCH PROFILE FOR REDUCING PARTICLE TAS

(75) Inventors: Ellis T. Cha, San Ramon, CA (US); Zhu Feng, Pleasanton, CA (US); Xinjiang Shen, Fremont, CA (US); Sindy Yeung, Fremont, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 679 days.

(21) Appl. No.: 11/594,343

(22) Filed: Nov. 7, 2006

(65) Prior Publication Data

US 2008/0106818 A1      May 8, 2008

(51) Int. Cl.
*G11B 5/127* (2006.01)
(52) U.S. Cl. .................................. 216/22; 29/603.12
(58) Field of Classification Search .............. 216/22
See application file for complete search history.

(56) References Cited

U.S. PATENT DOCUMENTS

| 5,754,367 | A | * | 5/1998 | Chang et al. ............ 360/235.6 |
| 5,774,304 | A | * | 6/1998 | Crane et al. ............. 360/236.9 |
| 5,870,250 | A | * | 2/1999 | Bolasna et al. ........... 360/236.8 |
| 6,212,032 | B1 | * | 4/2001 | Park et al. ............... 360/234.7 |
| 6,359,753 | B1 | * | 3/2002 | Osaka et al. ............. 360/235.4 |
| 6,477,013 | B1 | * | 11/2002 | Kang et al. .............. 360/236.3 |
| 6,608,735 | B1 | * | 8/2003 | Serpe et al. ............. 360/236.4 |
| 6,870,709 | B2 | | 3/2005 | Shimanouchi et al. |
| 2002/0163762 | A1 | * | 11/2002 | Levi et al. ............... 360/236.2 |
| 2003/0090833 | A1 | * | 5/2003 | Tani et al. ............... 360/110 |
| 2004/0120075 | A1 | * | 6/2004 | Rajakumar .............. 360/235.8 |

* cited by examiner

*Primary Examiner*—Anita K Alanko
(74) *Attorney, Agent, or Firm*—Saile Ackerman LLC; Stephen B. Ackerman

(57) ABSTRACT

An embodiment of the present invention is an ABS design with a pitch ladder feature. This embodiment has an air flow squeezing channel which consists of one airflow blocker and three etching steps. The airflow blocker can be used to limit the incoming air flow from the leading edge of the ABS. Additionally, the embodiment contains an air channel that reduces altitude sensitivity by channeling air at the inner diameter into a sub-ambient pressure cavity.

6 Claims, 5 Drawing Sheets

(a) an air bearing without pitch ladder (b) the air bearing with pitch ladder

AIR BEARING DESIGN WITH A FLATTER PITCH PROFILE FOR REDUCING PARTICLE TAS

FIELD OF THE INVENTION

The present invention relates to the field of air bearing sliders such as those used in hard disk drives. More specifically, the present invention relates to an air-bearing design for a slider utilizing a pitch ladder and an air-chair channel with a sub-ambient pressure cavity for controlling the pitch profile for CSS drives.

BACKGROUND

Hard disk drives are common information storage devices essentially consisting of a series of rotatable disks that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing. The ABS of a slider is generally configured on the slider surface facing the rotating disk, and greatly influences its ability to fly over the disk under various conditions. For a typical disk drive (~160 GB/platter) on the market, the distance between a magnetic head and the media is less than 10 nm. In order to correctly read and write data, it is essential that the sliders fly stably over the magnetic recording media during reading and writing.

There are currently two types of drive designs on the market. The first is a Load/Unload (LUL) design, where sliders stay on a ramp that is outside the perimeter of the magnetic disk when no reading or writing is performed. The second is a Contact Start Stop (CSS) design, where the sliders park on the magnetic media at the innermost diameter (also referred to as the Landing Zone) of the magnetic disk when no reading or writing is performed. Once the disk stops rotating, the slider comes to rest on the surface of the disk. When the rotation of the disk begins again, the air-bearing is formed once again and the slider separates from the disk. In order to reduce friction between the slider and the disk, a very thin layer of lubricant on the order of a few nanometers, is applied to the surface of the disk. A common problem with the operations of CSS drives is the starting friction ("stiction"). Stiction is caused by viscous lubricant between the slider and the disk. In some cases, especially in a humid environment, the slider is held down strong enough that the disk fails to rotate. To correct this problem, pads are introduced onto the surface of the slider to reduce the area of contact between the slider and the disk. The pads are extremely tall to minimize the stiction problem described above.

The stiction consideration for CSS drives with padded sliders requires that the angle between the disk and backplane of the slider (commonly referred to as the "pitch angle" or "pitch") be above a certain value such that there is no pad contact. As a result of this need, it is not uncommon for a CSS drive to have a high flying pitch angle of greater than 150 microradians.

It is further realized that the flying pitch of a conventional ABS design for a CSS drive is not uniform across the diameter of a magnetic disk. Due to the greater tangential velocity, and hence greater air flow, at the outer diameter of the disk (OD), the pitch angle at the OD of the disk is usually much higher than that in the start stop zone.

FIG. 1 shows a slider body 100 with a high pitch angle and some particles 140a-b flying between the slider 100 and disk 120. The slider has a magnetic sensor (i.e. a read/write element) 150 for reading and writing at the trailing edge. At higher pitch angles, more particles are likely to pass through the magnetic sensor 150 which can cause critical reliability issues such as thermal asperity (TA) or even physical damage to the read/write element 150. Thermal asperity occurs when particles on the disk surface change the resistance between the read/write element and the disk surface, thus causing read/write errors. Physical damage to the read/write element 150 can occur when large particles 140b make contact with magnetic sensor 150. Repeated impact with particles in the disk drive can degrade or even permanently damage the read/write element 150.

Another important reliability issue is the uneven flying heights (FH) at high altitudes due to uneven flying pitch. The lift force experienced by the ABS is a product of both air density and the amount of air flow. Therefore, a conventional ABS design will have a lower flying height in the less-dense air of high altitudes than it has at sea level. This can be especially problematic at the inner diameter (ID) where there is less air flow to lift the ABS. The FH at the inner diameter is usually low with a low flying pitch, which can result in head-disk contact or failure at high altitude. Reducing altitude FH sensitivity is one way to deal with this difficulty. However, this approach does not solve the issues associated with pitch drop at certain tracks. For example, the FH at the sensor area may change only slightly, but the flying pitch could still drop significantly, moving the minimum FH location to the leading edge of the ABS (such as anti-stiction pads), causing altitude failure at the inner radius of the disk. Therefore, a high enough pitch angle should be maintained at the ID.

In view of these reliability issues associated with current CSS drives with high pitch ABS designs, the present invention proposes using a pitch ladder and an air channel for controlling the pitch profile of CSS drives.

DETAILED DESCRIPTION

Figure 1:
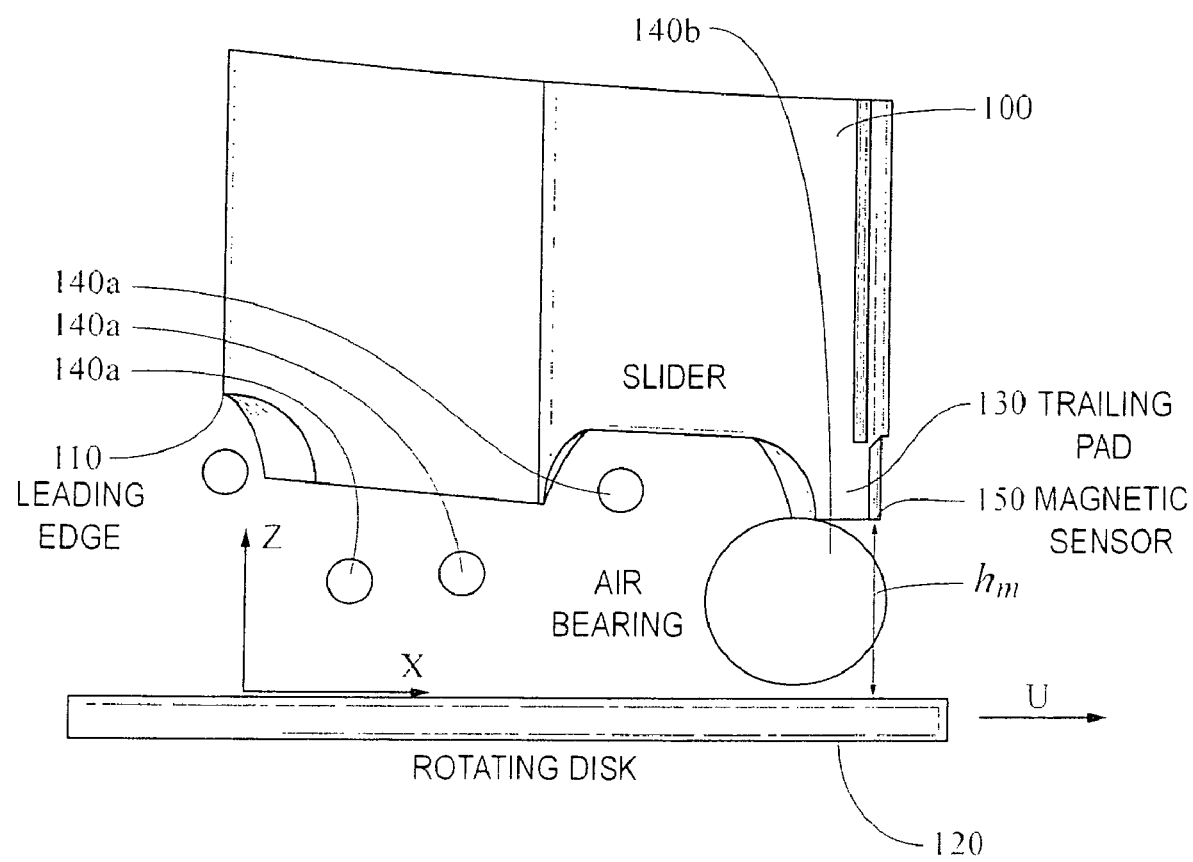
FIG. 1 an ABS with particles between the read/write element and the disk surface.
Figure 2:
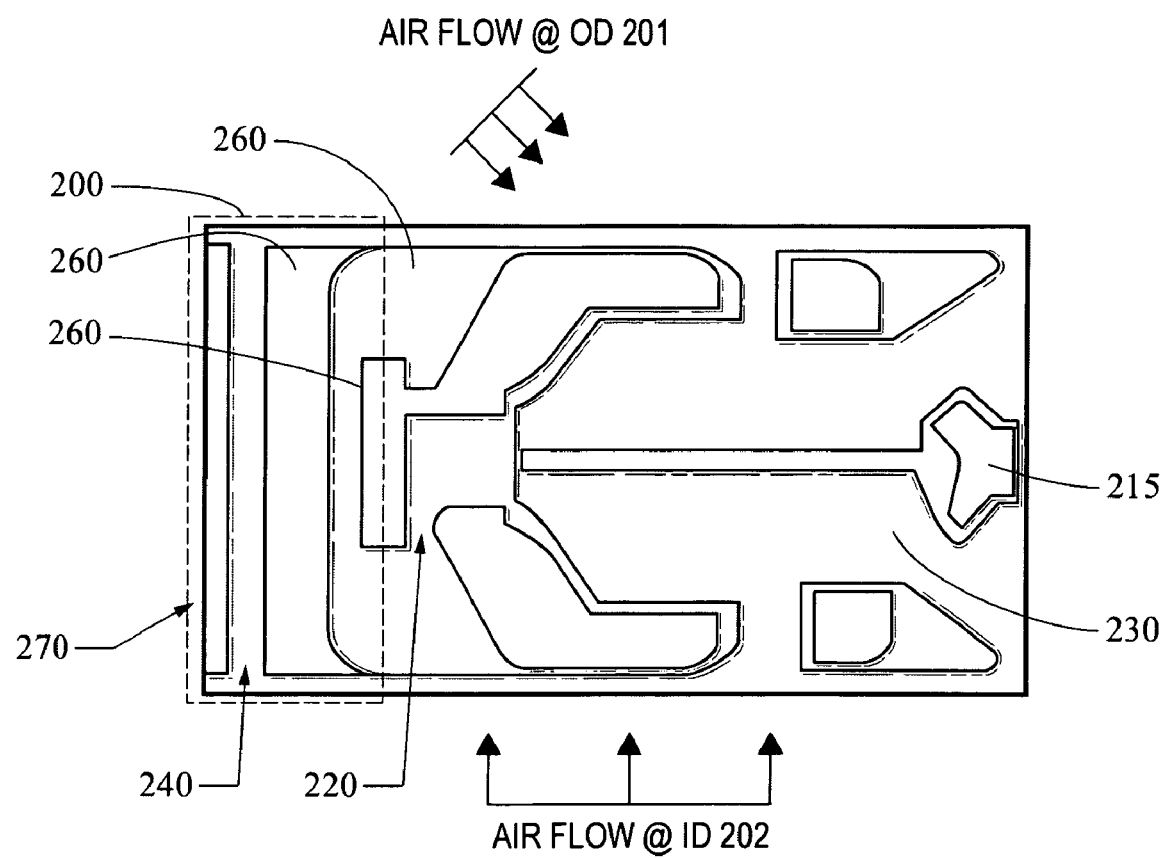
FIG. 2 shows an example of an ABS design with a flattening pitch profile feature for reducing particle TAs.

FIG. 2 shows an example of an ABS design with a pitch ladder feature 200. The embodiment shown has an air flow squeezing channel 240 which includes one airflow blocker 270 and three etching steps 260. The airflow blocker 270 can be used to limit the incoming air flow from the leading edge of the air bearing. The amount of air flow at the leading edge varies depending on the disk rotation speed and the ABS's orientation relative to the air flow. As shown on FIG. 2 at 201 and 202, the orientation of the air flow will change depending where on the disk the ABS is located.

The embodiment shown uses three-step stairs 260 to increase the effective air squeezing cross-area for the air bearing pitch angle. The effective air squeezing cross-area is defined as the summation of the product of the length and depth of each step for all steps in the pitch ladder. The dynamic pitch angle of an air bearing surface is nonlinearly proportional to the effective air squeezing cross-area for a given amount of incoming air flow. The air bearing dynamic pitch saturates when the air flow squeeze cross-area is large enough. Due to the minimum incoming air flow difference from the inner diameter to the outer diameter and increased effective air squeezing cross-area, the air bearing dynamic profile can be controlled uniformly from the ID to OD since the air bearing dynamic pitch angle has reached a saturation value at all diameters.

The squeezing air will produce a high pressure on the leading pad and generate a sub-ambient pressure region in the cavity. When the pressure on the leading pad saturates with the pitch ladder, the pitch angle has reached a steady value for different disk tracks.

The embodiment of FIG. 2 further shows an air channel 220 that can be used for reducing altitude sensitivity. The air channel 220 may be oriented in such a way that air flow at the ID is channeled into a sub-ambient pressure cavity, thus creating a greater lift force under conditions where the air velocity is lower. A constant flying height from the ID to the OD can be achieved by adjusting parameters such as the width of the air channel 220 and the dimensions of the sub-ambient pressure cavity 230 relative to the parameters of the pitch ladder 200 such as the depth and width of the air flow squeezing channel 240 and the effective air-squeezing cross area.

Figure 3:
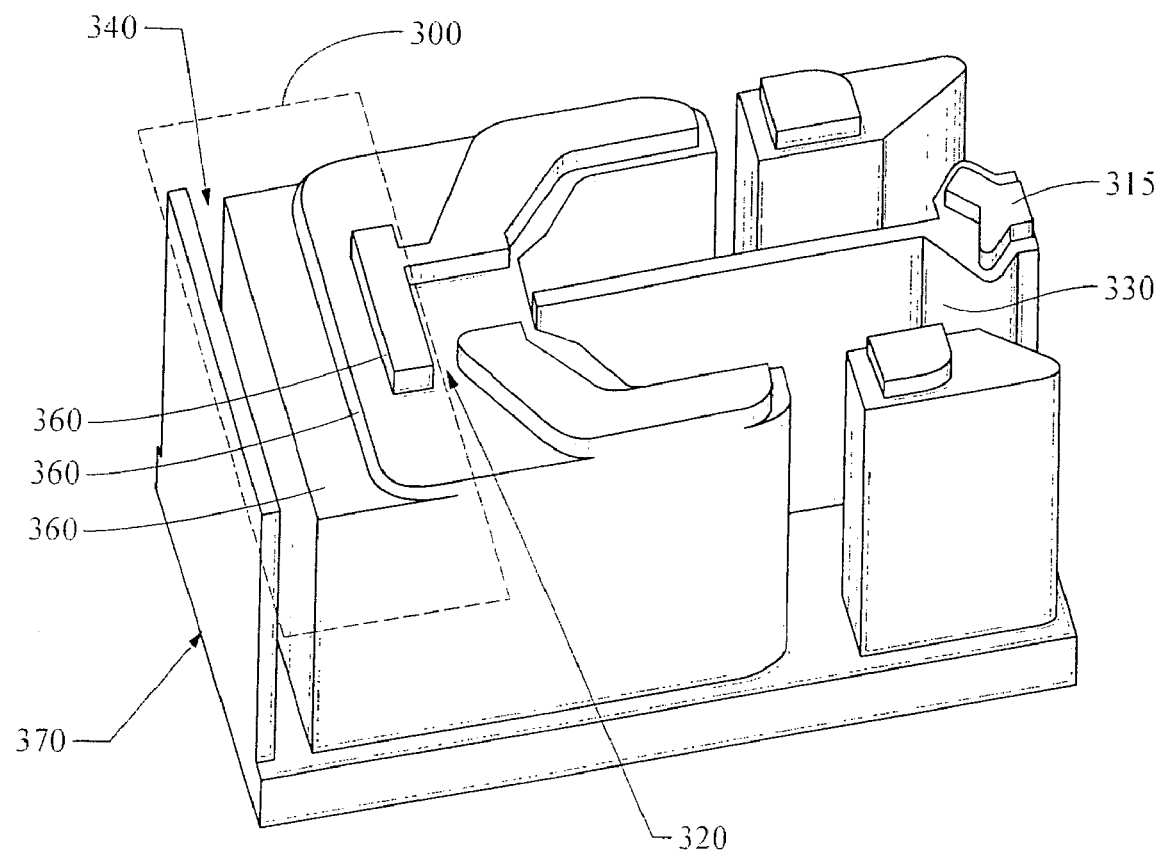
FIG. 3 shows an example of 3-D geometry for an ABS design with a flat pitch profile.

FIG. 3 shows the three-dimensional geometry of an exemplary ABS with a pitch ladder and an air channel for reducing altitude sensitivity, similar to the exemplary embodiment of FIG. 2. The ABS includes a pitch ladder 300 comprised of an air flow squeezing channel, an air blocker 370, and three etching steps 360. The exemplary embodiment of FIG. 3 also shows an air channel for reducing altitude sensitivity 320 and a sub-ambient pressure cavity 330 for creating a greater lift force at the ID. For an embodiment such as this, the design parameters of the pitch ladder and the air channel can be adjusted to achieve a pitch and flying height at the CSS zone that is high enough to avoid contact with the disk at the ID but not so high at the OD that it causes TA failure or other reliability issues.

Figure 4:
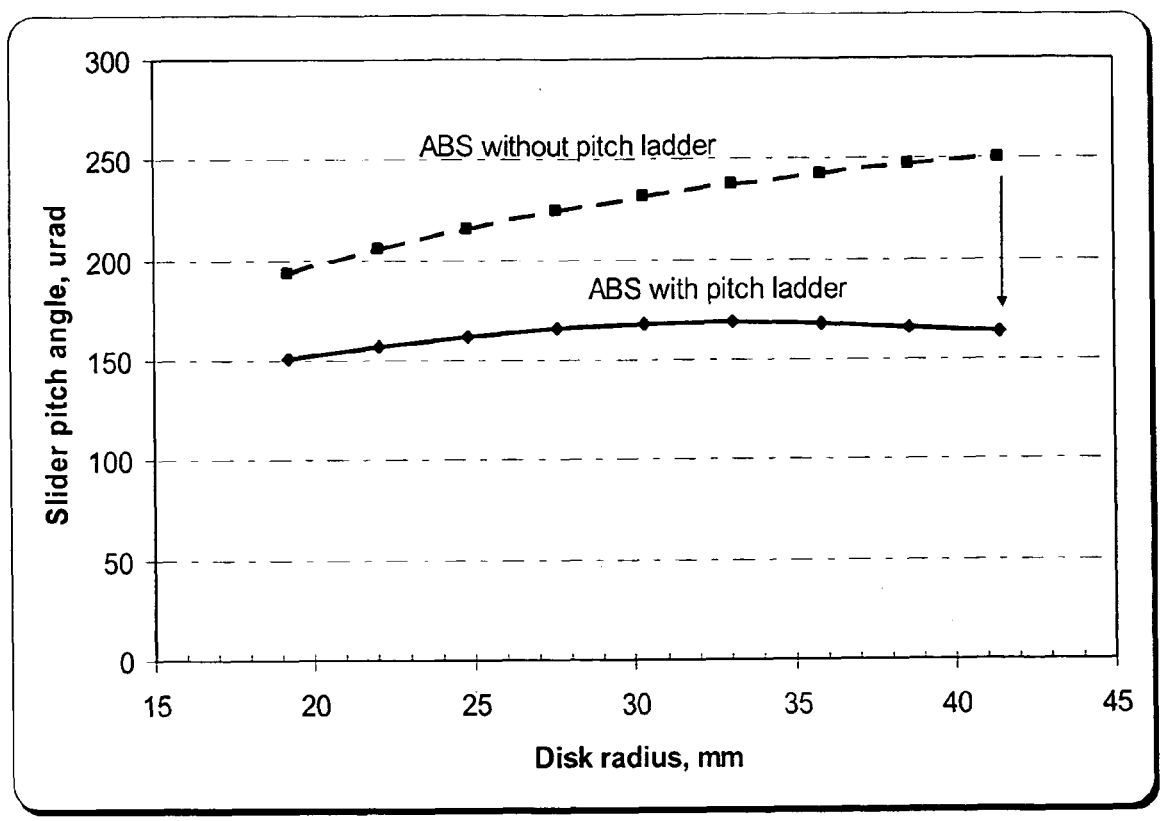
FIG. 4 shows the dynamic pitch profile of an exemplary ABS design with a pitch ladder compared to an ABS design without a pitch ladder.

FIG. 4 shows the dynamic pitch profiles from the ID to OD of the drive for two Pemto air bearing designs, one with the pitch ladder feature and one without. Both air bearing sliders fly on a three and half inch desktop drive rotating at 7200 RPM. The air bearing pitch angles for both designs can be calculated from Reynolds' equation or by using commercially available software such as the air bearing software developed by the Computer Mechanics Laboratory at the University of California at Berkeley.

For the traditional ABS without a pitch ladder feature, the dynamic pitch at the ID drops significantly because the incoming air flow at the ID is much smaller than at the OD, and also because the air squeeze cross-area is not big enough to reach a saturation level, causing the air bearing pitch angle to vary substantially with the amount of incoming airflow. Alternatively, for the ABS with the pitch ladder feature, the dynamic pitch varies only minimally from the ID to the OD. As evidenced by FIG. 4, the pitch angle remains almost constant across the disk, thus greatly reducing the chances for TA or other critical reliability failures to occur.

Figure 5A:
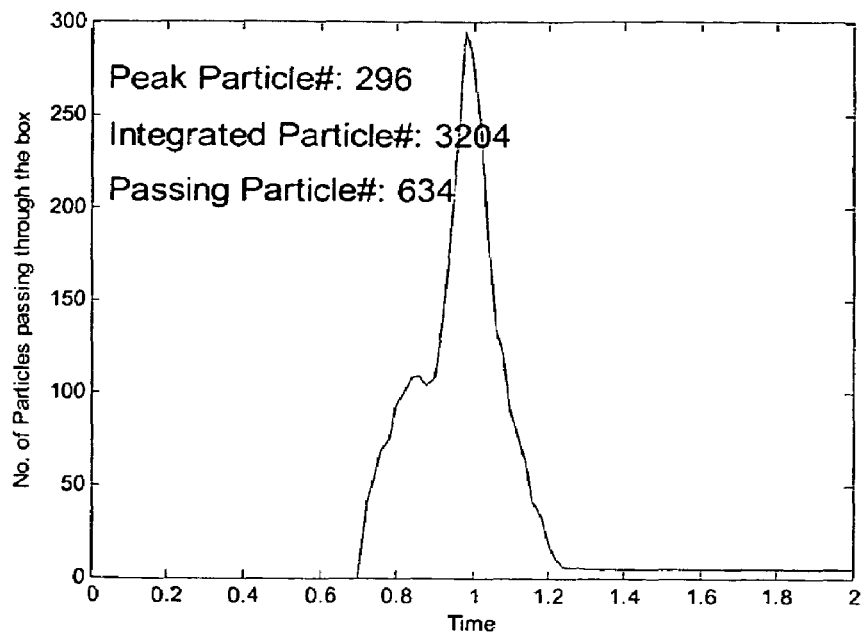
FIGS. 5 a-b show the number of particles passing through the magnetic sensor at the outer diameter for an exemplary design with a pitch ladder and for an exemplary design without a pitch ladder.
Figure 5B:
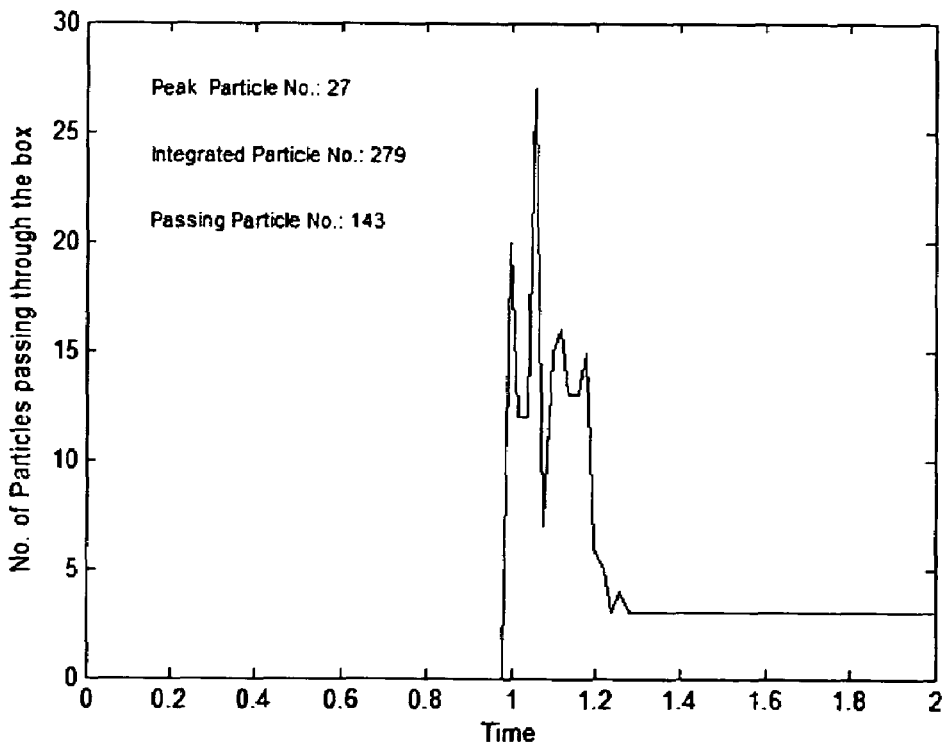

An illustrative embodiment of the role of the pitch ladder is shown in FIG. 5. A particle's flying dynamics between the magnetic head and rotating disk can be solved using Newtonian dynamics if the hydrodynamic forces acting on the particles by the air flow are known. It is assumed that there are 3000 particles whose size follows a Gaussian distribution. These particles have a mean size of 100 nm and a standard distribution of 15 nm which is typical for particles generated during the disk drive manufacturing process. The particles are initially floating in the drive before entering the magnetic head which is flying on the rotating disk. Their flying history can be simulated using particle flow software that can record the flying paths of each particle. The number of particles passing through the magnetic sensor can also be recorded by the simulation. The peak number of particles shows the maximum number of particles passing through the same area in their flying history. The passing number of particles is the total number of particles passing through the magnetic sensor out of 3000 flying particles in the disk drive. The integrated number of particles gives the addition of particle numbers in the magnetic sensor area in their total flying time range. The passing number of particles for the air bearing with the pitch ladder can be reduced dramatically from 634 to 143 particles in the hard drive. The possibility of TA is linearly dependent on the number of particles passing through the magnetic sensor during drive operations, which means the pitch ladder of the present embodiment reduces the chances of TA failure in the drive by 75% relative to drives currently on the market. Additionally, due to the lower pitch angle, the flying height loss at high altitudes is reduced. Therefore, improved altitude performance as well as low sensitivities to dynamic seeking can be achieved.

Although embodiments are specifically illustrated and described herein, it will be appreciated that modifications and variations of the present invention are covered by the above teachings and are within the purview of the appended claims without departing from the spirit and intended scope of the invention.

What is claimed is:

1. A method of manufacturing a slider comprising:
   etching a slider body so as to form an air bearing surface in said slider body; and
   etching said slider body so as to form a an airflow squeezing channel on said air bearing surface; wherein said air flow squeezing channel further comprises an airflow blocker formed at a leading edge of said slider and formed parallel to said leading edge and a pitch ladder, wherein said pitch ladder is a sequence of three steps parallel to said air flow blocker and formed on the trailing edge side of said air flow blocker, wherein each of said three steps is etched into said slider with a depth that increases in a direction from the trailing to the leading edge side of said slider, whereby the deepest etched step is immediately behind said air flow blocker.

2. The method as set forth in claim 1 wherein the combination of said pitch ladder and said air flow blocker acts as an air flow squeezing channel.

3. The method as set forth in claim 1 wherein said air bearing surface further contains a sub-ambient air pressure cavity formed on the trailing edge side of said pitch ladder and an air channel formed asymmetrically between said pitch ladder and said sub-ambient pressure cavity and oriented for directing air into said sub-ambient pressure cavity.

4. The method as set forth in claim 3, further comprising adjusting the aerodynamic properties of said pitch ladder and said air channel to achieve a substantially consistent dynamic pitch profile.

5. A method of manufacturing a slider comprising:
   etching a slider body so as to form an air bearing surface in said slider body; then
   further etching said air bearing surface to create an air blocker and a sequence of three steps parallel to said air flow blocker formed on the trailing edge side of said air flow blocker, wherein each of said three steps is etched into said slider with a depth that increases in a direction from the trailing to the leading edge side of said slider, whereby the deepest etched step is immediately behind said air flow blocker; then
   etching a sub-ambient pressure cavity in said slider body; and
   etching said slider body so as to form an asymmetrically oriented air channel for directing air in a direction from said airflow blocker into said sub-ambient air pressure cavity.

6. The method as set forth in claim 5, further comprising adjusting the aerodynamic properties of said airflow blocker, said three steps and said asymmetrically oriented air channel to achieve a substantially consistent dynamic pitch profile.

* * * * *